March 8, 1966 L. KING 3,239,399
METHOD FOR LAMINATING PLASTIC FOAM AND FABRIC SHEETS
Filed March 27, 1961 4 Sheets-Sheet 1
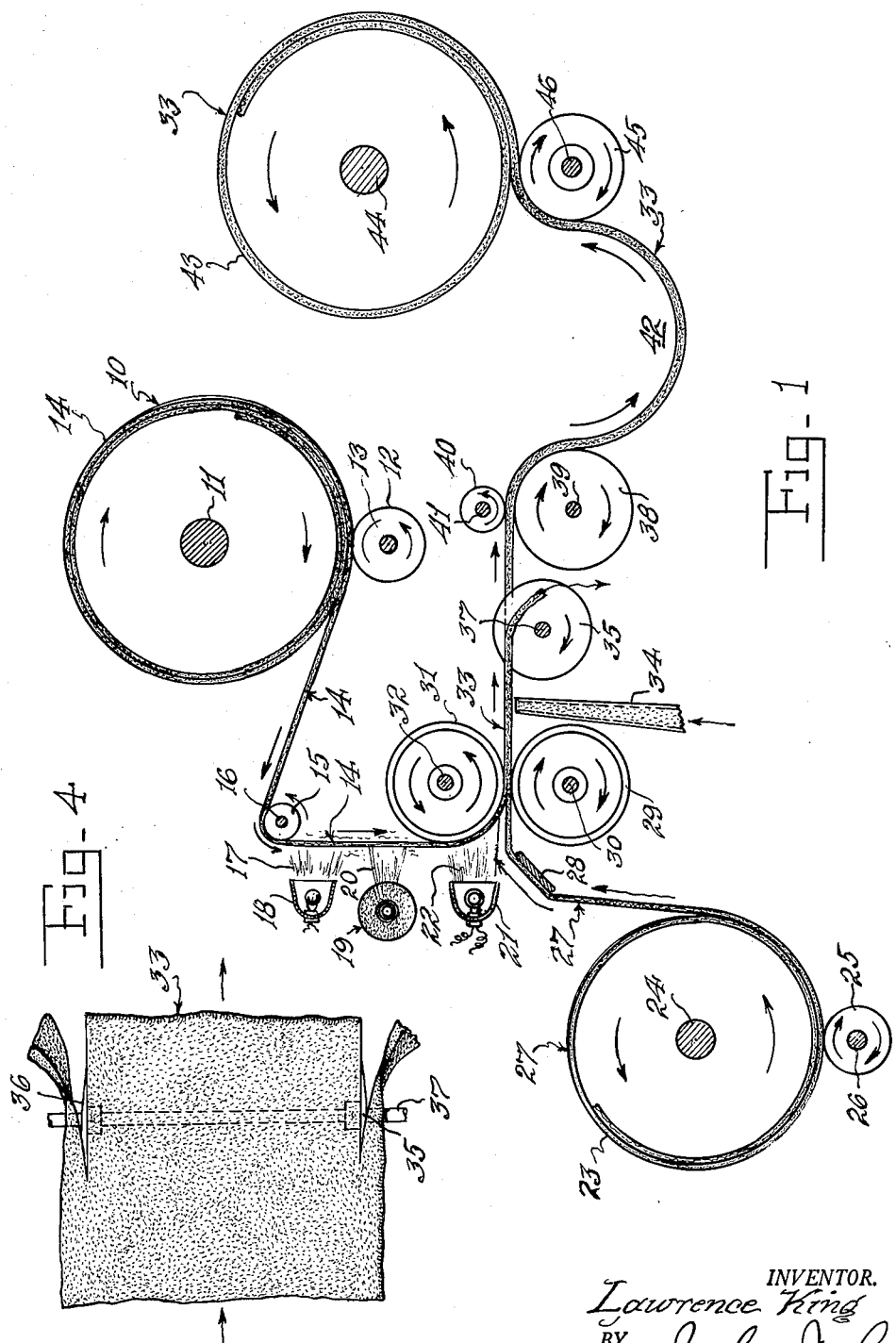
INVENTOR.
Lawrence King
BY Jacoki & Jacoki
ATTORNEYS.

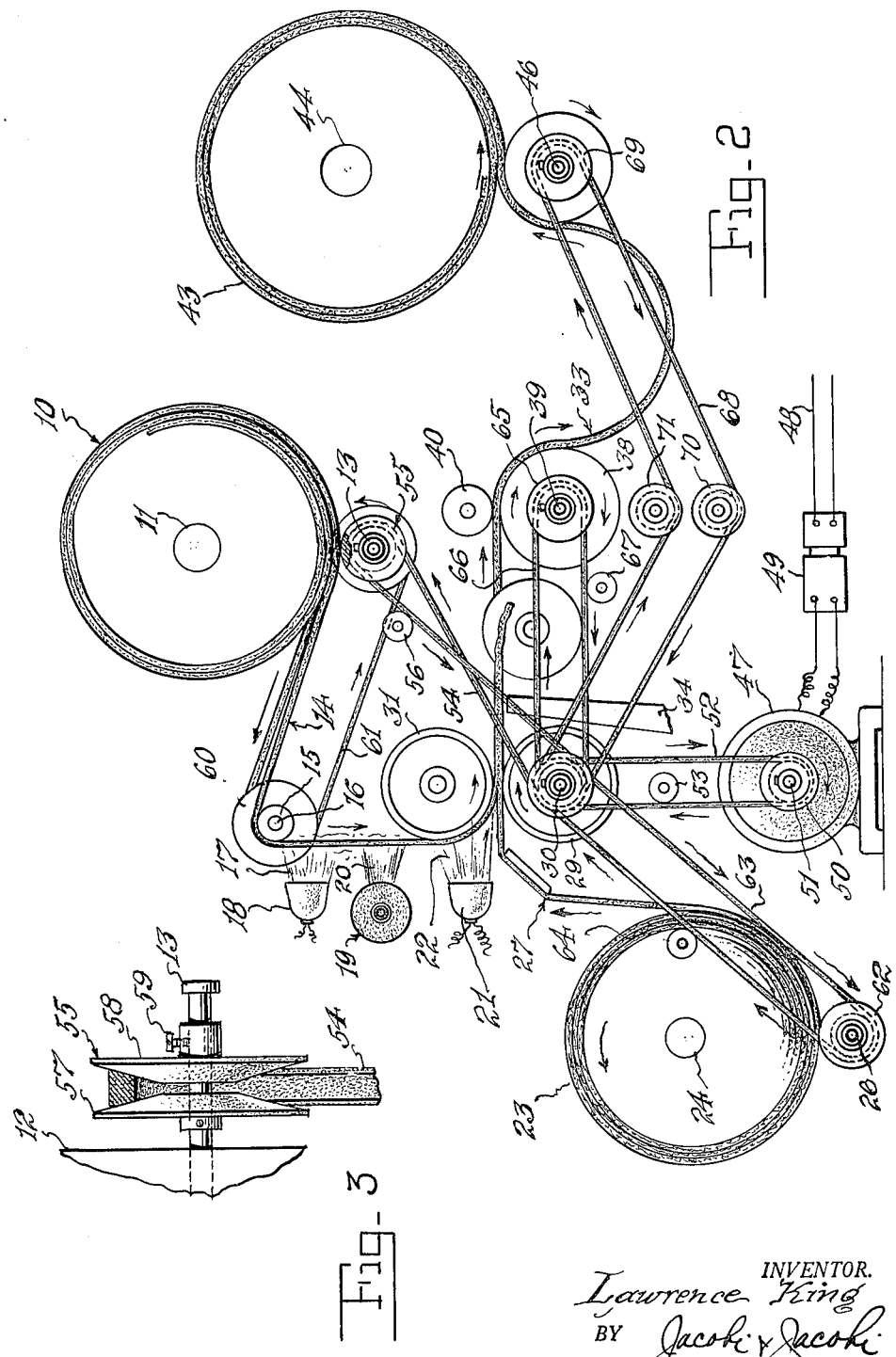

March 8, 1966 L. KING 3,239,399
METHOD FOR LAMINATING PLASTIC FOAM AND FABRIC SHEETS
Filed March 27, 1961 4 Sheets-Sheet 3
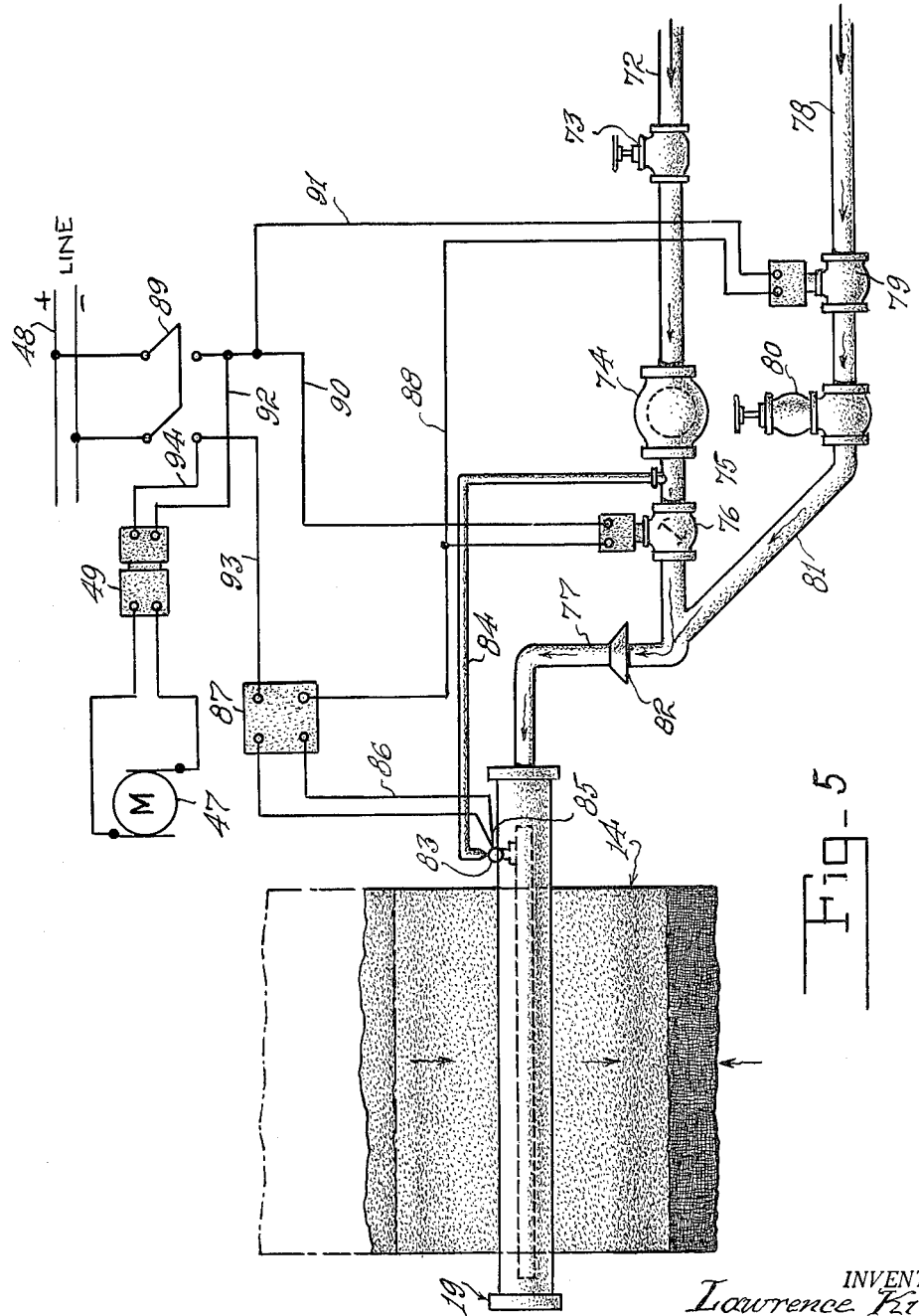

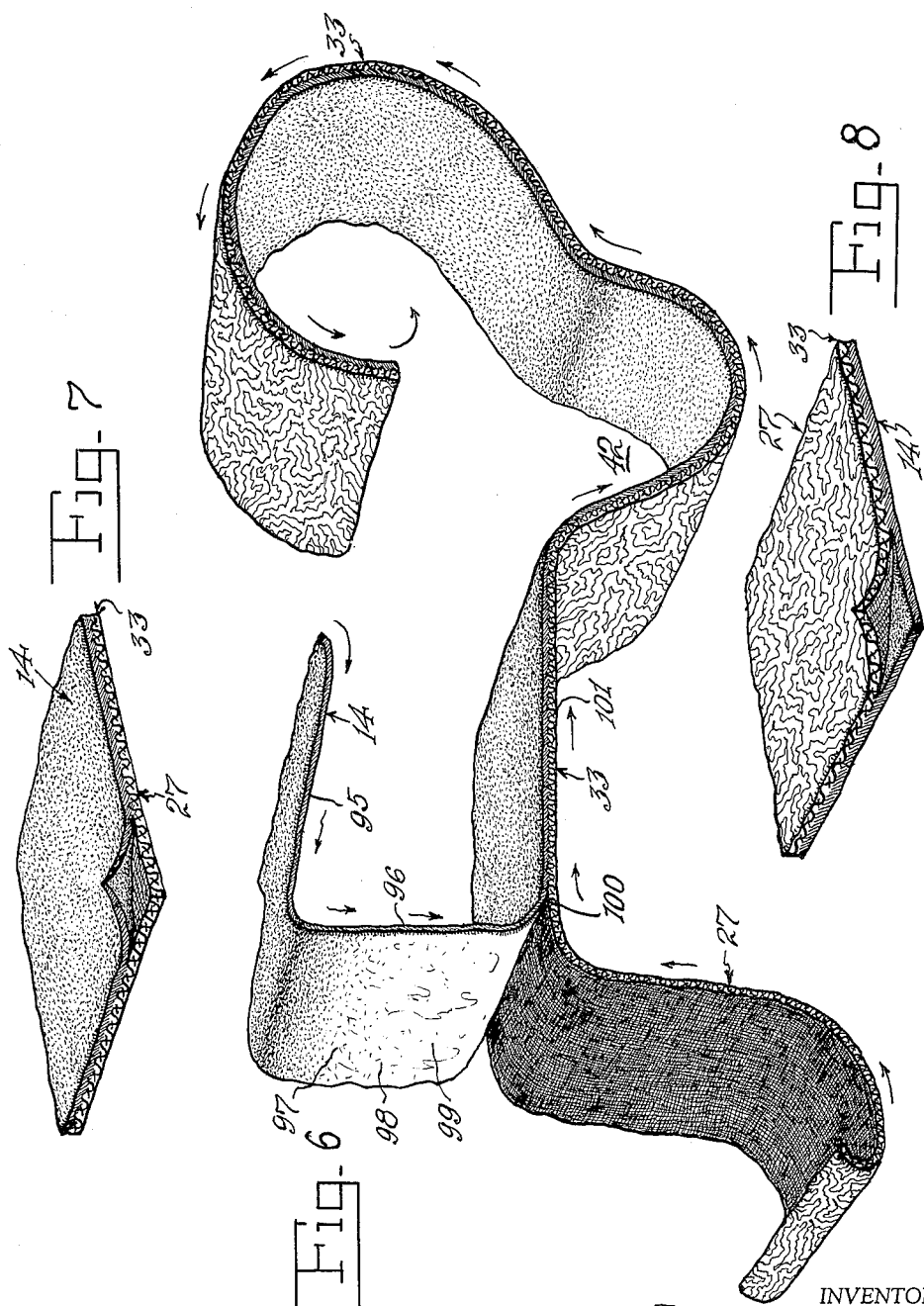

United States Patent Office 3,239,399
Patented Mar. 8, 1966

3,239,399
METHOD FOR LAMINATING PLASTIC FOAM
AND FABRIC SHEETS
Lawrence King, East Rockaway, N.Y., assignor to Rosfor Mills Corporation, New York, N.Y., a corporation of New York
Filed Mar. 27, 1961, Ser. No. 98,417
2 Claims. (Cl. 156—82)

This invention relates to the treatment of material and more particularly to a method for laminating plastic foam and fabric sheets to provide a laminate having substantially uniform dimensional characteristics and free of internal stresses.

Heretofore plastic foam and fabric sheets have been united to provide a laminate by utilizing various types of adhesives, by utilizing solvents to soften a surface of the plastic and render the same tacky and also, by the utilization of heat to soften a surface of the plastic and render the same tacky to provide a bond between the plastic foam and the fabric. As is well known, plastic foam is dimensionally relatively unstable and where tension is applied to the same during feeding to an apparatus for uniting the plastic foam with a fabric sheet, the plastic foam tends to stretch non-uniformly thereby causing thick and thin areas with the result that the laminate formed by uniting the foam with a sheet of fabric is not dimensionally uniform. Furthermore, in many cases and particularly where heat is utilized, to soften a surface of the plastic foam to render the same tacky, internal stresses are set up in the plastic foam and where no means is provided for eliminating or relieving such internal stresses, the resulting product is frequently rendered inferior by the presence of wrinkles or bulges which materially detract from the utility of the product.

The laminate provided by the method of this invention is primarily intended for use in making various types of garments, but obviously, such laminate may be utilized for any purpose to which the same is particularly well adapted and accordingly, this application will be directed to a method for forming a laminate of plastic foam and fabric sheets which may be utilized for any suitable purpose.

It is further to be noted that the lamination of plastic foam and fabric sheets has heretofore been accomplished by utilizing a gas flame impinging on a surface of the plastic to raise the temperature thereof to the melting point and render the same tacky and since, the gas flame was the sole means utilized for heating a surface of the plastic, the time required for raising the temperature thereof to the melting point resulted in burning away an excessive quantity of the plastic foam and furthermore, by reason of utilizing a gas flame as the sole means for heating the plastic foam it was necessary to provide for cooling of such foam well below the melting point thereof prior to contact of the foam with the fabric in order to prevent damage to the fabric by reason of the excessive heat present in the plastic foam.

It is accordingly an object of this invention to provide a method for laminating plastic foam and fabric sheets to provide a laminate which is substantially free from internal stresses and is dimensionally uniform.

A further object of the invention is the provision of a method for laminating plastic foam and fabric sheets in which damage to the fabric by reason of excessive heat is prevented.

A still further object of the invention is the provision of method for laminating plastic foam and fabric sheets in which the plastic foam is maintained under substantially zero tension during the operation in order to eliminate thick and thin spots or areas, thereby providing a laminate having substantially uniform dimensions.

Another object of the invention is the provision of a method for laminating plastic foam and fabric sheets, including pre-heating a surface of the plastic foam by far infrared rays to a temperature below the melting point, thereafter raising the temperature of such surface to the melting point by means of a gas flame and maintaining the temperature of such surface at the melting point by far infrared rays immediately prior to application of the fabric to such melted surface.

A further object of the invention is the provision of a method for laminating plastic foam and fabric sheets, including pre-heating a surface of the plastic foam by radiant heat to a temperature below the melting point, thereafter raising the temperature of such surface by means of a flame to the melting point and maintaining the temperature of such surface at the melting point by means of radiant heat immediately prior to applying the fabric sheet to the melted surface of the plastic foam.

A still further object of the invention is the provision of a method for laminating plastic foam and fabric sheets in which a surface of the plastic foam is first pre-heated to a temperature below the melting point, the temperature thereof being thereafter raised to the melting point, such temperature being maintained at the melting point until a sheet of fabric is applied to such surface under pressure to provide an intimate bond therebetween.

Another object of the invention is the provision of a method for laminating plastic foam and fabric sheets in which a surface of the plastic foam is heated to the melting temperature and maintained at such temperature until the fabric sheet is applied to such surface under pressure to provide an intimate bond therebetween, the resulting laminate thereafter being cooled to remove excessive heat and facilitate the elimination of internal stresses in the laminate.

A further object of the invention is the provision of a method for laminating plastic foam and fabric sheets utilizing heat to raise the temperature of a surface of the plastic foam to the melting point and maintain such temperature prior to application of the fabric to the surface of the foam under pressure, cooling the resulting laminate to remove excess heat, trimming the edges of the laminate to provide a sheet of the desired width and thereafter feeding the laminate through an elongated path under substantially zero tension to eliminate internal stresses therein.

A still further object of the invention is the provision of a method for laminating plastic foam and fabric sheets utilizing heat to raise the temperature of a surface of the plastic foam to the melting point and maintaining such temperature prior to application of the fabric sheet to the melted surface of the foam under pressure, cooling the resulting laminate to remove excess heat, feeding the laminate through an elongated path under substantially zero tension to eliminate internal stresses and thereafter winding the laminate on a roll under substantially zero tension to preserve uniform dimensional characteristics.

Another object of the invention is the provision of a method for laminating plastic foam and fabric sheets in which the plastic foam, the fabric and the resulting laminate are maintained under substantially zero tension throughout the entire laminating operation.

A further object of the invention is the provision of a method for laminating plastic foam and fabric sheets in which the plastic foam is fed from a driven roll of foam to a driven feed roll under substantially zero tension, the fabric being fed from a driven roll of fabric to pressure rolls for uniting the plastic foam and fabric, there being additional feed rolls for feeding the laminate under substantially zero tension and a driven roll for winding the laminate under substantially zero tension and including variable speed drive means for the various rolls, the feed rolls and the pressure rolls.

A still further object of the invention is the provision of a method for laminating plastic foam and fabric sheets in which a surface of the plastic foam is pre-heated by far infrared rays to a temperature below the melting point, such far infrared rays being controlled to limit penetration of the plastic foam, the temperature of the surface thereafter being raised to the melting point by a flame and maintained at such melting point by far infrared rays which are likewise controlled to limit the penetration thereof.

Another object of the invention is the provision of a method for laminating plastic foam and fabric sheets in which a surface of the plastic foam is heated to the melting point by heating means, including a gas flame, there being a pilot burner for the gas burner, including means for eliminating flow of gas to the burner in the event of failure of the pilot burner, there also being interlocking means between the controls for the gas burner and the drive for the rolls, feed rolls and pressure rolls of the laminating apparatus to prevent operation of such apparatus prior to ignition of the gas burner.

The term "under substantially zero tension" as used in this specification and the appended claims refers to the condition of the plastic foam or foam sheet when the same is not subjected to tension, or in other words, when the frame is handled with a substantial absence of tension thereon.

Further objects and advantages of the invention will be apparent from the following description taken in conjunction with the accompanying drawings wherein:

FIG. 1 is a diagrammatic view showing a laminating apparatus constructed in accordance with this invention;

FIG. 2 a diagrammatic view similar to FIG. 1, but showing the drive means for the various rolls, feed rolls and pressure rolls;

FIG. 3 a fragmentary elevational view showing a variable speed means which may be utilized for controlling the speed of operation of the various rolls, feed rolls and pressure rolls;

FIG. 4 a fragmentary top plan view showing the manner in which the spaced knives are utilized to trim the edges of the laminate;

FIG. 5 a diagrammatic view showing the gas burner, together with the gas and air supply therefor, as well as the electrical means for controlling such supply and the interlocking electrical control circuit between the gas burner and the drive motor for the apparatus;

FIG. 6 a view in perspective showing the plastic foam and fabric sheets, the manner in which the plastic foam is treated to provide a bond between the same and the fabric sheet, as well as the resulting laminate with internal stresses eliminated and being wound on a roll under substantially zero tension;

FIG. 7 a fragmentary view in perspective showing the laminate formed in the machine of this invention and viewed from the side formed by the plastic foam; and FIG. 8 a view in perspective similar to FIG. 7, but showing the laminate formed in the machine of this invention and viewed from the side formed by the fabric sheet.

With continued reference to the drawings, there is shown an apparatus for laminating plastic foam and fabric sheets which may well comprise a roll 10 of plastic foam mounted for rotation on a shaft 11 and the roll 10 may be driven by friction or other suitable drive means 12 mounted on a shaft 13. The roll 10 serves to provide a supply of plastic foam in the form of an elongated sheet 14 and from the roll 10 the plastic foam 14 passes over a driven feed roller 15 mounted on a shaft 16. Since the roll 10 is driven to unwind the plastic foam 14 therefrom and since the feed roller 15 is also driven to feed the plastic foam 14 at the same rate as the same unwinds from the roll 10, the plastic foam 14 between the roll 10 and the roller 15 will be under substantially zero tension, thereby eliminating the possibility of thick and thin spots or areas existing therein due to stretching of the foam.

From the feed roller 15 the plastic foam 14 travels through a pre-heating zone 17 and disposed in spaced relation to the plastic foam 14 in the region of the pre-heating zone 17 is a source of radiant heat in the form of one or more far infrared heat sources 18 and the operation of such far infrared heat sources may be suitable controlled to limit depth of penetration of the heat rays into the plastic foam 14 disposed opposite the heat sources 18. The radiant heat source 18 is so adjusted as to raise the temperature of the plastic foam 14 in the pre-heating zone 17 to a temperature below the melting temperature of the plastic foam 14, and such heating takes place only at the surface of the plastic foam 14 facing the heat source 18.

Spaced from the pre-heating radiant heat source 18 and disposed transversely of the path of travel of the plastic foam 14 is a gas burner 19, the flame 20 of which impinges on the surface of the plastic foam 14 to raise the temperature thereof from the pre-heated temperature to the melting point of the plastic foam. Since the surface of the plastic foam 14 has been pre-heated, the contact of the flame 20 with the surface of the plastic foam will result in burning away a minimum amount of the foam, since the temperature rise necessary to bring the surface of the plastic foam 14 to the melting point is relatively small and consequently, contact between the flame 20 and the plastic foam 14 is limited to a relatively short time interval. The structure and operation, as well as the control of the gas burner 19 will be later described.

Spaced from the gas burner 19 and disposed transversely of the path of travel of the plastic foam 14 is a radiant heat source 21 which may take the form of far infrared heat sources of the same type as utilized in the radiant heat source 18 and the heat rays 22 from the radiant heat source 21 impinge on the heated surface of the plastic foam 14 to maintain the temperature thereof at the melting point. Once again the far infrared heat source 21 may be so adjusted as to limit the penetration of the heat rays 22 into the plastic foam 14 to a predetermined depth. The operation of the pre-heating radiant heat source 18, the gas burner 19 and the radiant heat source 21 serve to render the surface of the plastic foam 14 tacky which will result in providing a firm and intimate bond between the plastic foam 14 and a sheet of fabric in a manner to be now described.

A roll 23 of fabric is rotatably mounted on a shaft 23 and the roll 23 may be driven by a suitable friction or other drive means 25 mounted on a shaft 26. A supply of fabric in the form of an elongated sheet 27 is provided by the roll 23 and from the roll 23 the fabric 27 passes over a wrinkle removing device 28 which may be of conventional construction and provided with a herringbone surface in contact with the fabric 27 which results in removing wrinkles therefrom in a well known manner.

A lower pressure roll 29 may be mounted on a shaft 30 which may be driven in a suitable manner to be presently described and disposed above the pressure roll 29 in spaced relation thereto, is a second pressure roll 31 rotatably mounted on a shaft 32. Suitable means may be provided, if desired, for adjusting the spacing between the upper pressure roll 31 and the lower pressure roll 29 in accordance with the thickness of material to pass therebetween and also in order to exert the desired degree of pressure on such material.

The plastic foam 14 with the surface thereof maintained at the melting temperature by the heat source 21, as well as the fabric sheet 27 pass between the pressure rolls 29 and 31 to apply the fabric sheet 27 to the tacky surface of the plastic foam 14 and passage between the rolls 29 and 31 results in uniting the fabric sheet 27 to the plastic foam 14 in a continuous manner to provide a laminate 33. Following the pressure rolls 29 and 31, a nozzle 34 or other suitable means may be provided to direct a stream of air into contact with the laminate 33 in order to cool the same and remove excess heat thereby setting the melted surface of the plastic foam 14 to provide an intimate and firm bond between such plastic foam 14 and the fabric sheet 27, thereby providing a laminate 33 in which the layers or plies thereof are inseparable.

In the event a laminate 33 of an exact width is required, there may be provided spaced rotary knives 35 and 36 mounted on a shaft 37 and as best shown in FIGS. 1 and 4, the knives 35 and 36 serve to shear excess portions of the laminate 33 from opposite side edges thereof to provide a laminate having an accurate transverse dimension. Following the knives 35 and 36 in the path of movement of the laminate 33 is a feed roller 38 mounted on a shaft 39 and the feed roller 38 is driven in a manner to be presently described. Spaced from the feed roller 38 is a pressure or backing roll 40 mounted on a shaft 41 and the backing roll 40 serves to urge the laminate 33 into firm engagement with the surface of the feed roll 38 to provide a positive feed for the laminate 33.

Since the heating and subsequent cooling of the plastic foam 14 tends to cause internal stresses therein, it is imperative that such internal stresses be eliminated in the laminate 33 in order to prevent bulges or wrinkles which would impair the quality of the product and consequently, from the feed roll 38 and backing roll 40, the laminate 33 is fed through an elongated path in the form of a depending loop 42 during which travel the laminate 33 is under substantially zero tension, the only tension therein being occasioned by the weight of the laminate itself.

A laminate roll 43 is rotatably mounted on a shaft 44 and the roll 43 may be driven by friction means or other suitable means 45 mounted on a shaft 46 and the driving means 45 is driven in a manner which will be presently described. From the depending loop path of travel 42 of the laminate 33 the same is wound on the roll 43 under substantially zero tension and consequently, since the internal stresses in the laminate 33 were eliminated during travel through the depending loop path 42 and since the laminate is wound on the roll 43 under substantially zero tension, the same will retain accurate dimensional characteristics and will also be free of wrinkles or bulges which would otherwise impair the quality thereof. The laminate may be removed from the roll 43 or the roll removed from the apparatus and transported to a desired location where the laminate is to be utilized for further manufacturing processes.

With particular reference to FIG. 2, there is shown a means for driving the rolls 10, 23 and 43, the feed rolls 15 and 38 and the pressure roll 29 and this means may well include a motor 47 connected to an electric power line 48 through a time delay relay 49 and the purpose and operation of such time delay relay will be presently described. A pulley 50 is mounted on the drive shaft 51 of the motor 47 and trained over the pulley 50 is a belt 52 which in turn is trained over a variable speed pulley mounted on the shaft 30 of the pressure roll 29. The variable speed pulley mounted on the shaft 30 may be of a conventional type to be presently described and in order to maintain driving tension in the belt 52 during adjustment of the variable speed pulley, there may be provided an idler pulley 53 engaging the belt 52. A belt 54 may be trained over a pulley fixed to the shaft 30 of the lower pressure roll 29 and the belt 54 in turn is trained over a variable speed pulley 55 fixed to the shaft 13 of the driving means 12 for the roll 10. In order to maintain driving tension in the belt 54, there may be provided an idler pulley 56 in engagement with the same.

The variable speed pulley 55, as well as the other variable speed pulleys utilized in the apparatus of this invention, may be of the type shown in detail in FIG. 3 in which a cone 57 is fixed to the shaft 13 and an opposing cone 58 is adjustably mounted on the shaft 13 to be moved toward or away from the cone 57 in order to increase or decrease the effective diameter of the pulley 55. The cone 58 may be locked in adjusted position on the shaft 13 by means of a set screw 59 or other suitable means, or if desired, a control lever and linkage system may be connected to the cone 58 in a manner to permit convenient adjustment thereof during operation of the apparatus and such means for adjusting a variable speed pulley of this type is conventional and well known and no detailed description thereof is considered necessary or desirable.

The feed roller 15 may be driven by means of a pulley 60 mounted on the shaft 16 and engaging a belt 61 which is trained over a pulley mounted on the shaft 13. In a similar manner, a variable speed pulley 62 is mounted on the shaft 26 of the driving means 25 for the roll 23 and engaging the variable speed pulley 62, as well as a pulley mounted on the shaft 30 of the lower pressure roll 29 is a belt 63 and driving tension may be maintained in such belt 63 by engagement with an idler pulley 64. The feed roller 38 is driven by means of a variable speed pulley 65 mounted on the shaft 30 and engaging a belt 66 which in turn engages a pulley mounted on the shaft 30 of the lower pressure roll 29 and in order to maintain driving tension in the belt 66 an idler pulley 67 is disposed in engagement therewith. A belt 68 engages a pulley mounted on the shaft 30 of the lower pressure roll 29 and in turn engages a variable speed pulley 69 mounted on the shaft 46 of the driving means 45 for the roll 43 and driving tension is maintained in the belt 68 by engagement with idler pulleys 70 and 71.

By use of the above described driving mechanism, it will be seen that the speed of the various rolls, feed rolls and pressure rolls may be adjusted to any desired value and any desired relationship between the speed of the various elements may be maintained in order to eliminate tension in the plastic foam, fabric and laminate during passage through the apparatus and the ability to adjust such relative speeds is of extreme importance in the satisfactory operation of the apparatus. While one form of drive means and speed adjusting means has been described, it will be understood that other equivalent means for accomplishing the same result may be utilized and furthermore, if desired, the drive motor 47 may be of a variable speed type in order to provide simultaneous speed change in all of the driven parts of the apparatus, but since the specific drive mechanism may take various forms, it is not considered necessary or desirable to describe other than the single form described above which will adequately perform the necessary speed control and driving functions.

With particular reference to FIG. 5, there is shown the gas and air supply system for the gas burner 19, as well as the control for such system and also the interlocking control means between the drive motor 47 and the control for the gas burner 19. A gas supply line 72 is connected through a suitable shut-off valve 73 to a gas pump 74 which may be utilized to deliver gas under a predetermined and constant pressure and volume. The gas pump 74 is connected through a conduit 75 to a solenoid control valve 76 which in turn is connected to a conduit 77 to the gas burner 19. An air supply line 78 connected to a suitable source of air under pressure is connected through a solenoid control valve 79 to a pressure reducing adjusting valve 80 which in turn is connected through a conduit 81 with the conduit 77 leading to the gas burner 19. Conventional air and gas mixing means 82 is provided in the conduit 77 with the result that a suitable air and gas mixture is delivered to the gas burner 19. A suitable pilot burner 83 is connected through a conduit 84 with the conduit 75 with the result that the pilot burner 83 is supplied with gas, regardless of whether the solenoid control valve 76 is in the open or closed position. In this manner, the gas burner 19 may be shut down by closing of the solenoid control valve 76 and upon re-opening thereof, the burner 19 will be re-lighted by the pilot burner 83, since such pilot burner 83 continues to burn, even though the solenoid control valve 76 is in closed position.

Means is provided to prevent operation of the solenoid control valves 76 and 79 to supply gas and air to the burner 19 in the event the pilot burner 83 has become extinguished and such means may take the form of a thermocouple 85 disposed adjacent the pilot burner 83 and connected through suitable conductors 86 with a control relay 87. The relay 87 is in turn connected through a conductor 88 with the solenoid control valves 76 and 79.

The electrical power supply line 48 is connected through a double pole single throw switch 89 with conductors 90 and 91 leading to the solenoid control valves 76 and 79 and through conductor 92 with the time delay relay 49. The switch 89 is also connected through conductor 93 with the control relay 87 and through conductor 94 with the time delay relay 49.

As a result of the above described control system closing of the switch 89 will result in energizing the solenoid control valves 76 and 79 provided the control relay 87 is in proper position as a result of the operation of the pilot burner 83 maintaining the thermocouple 85 in heated condition and the resulting opening of the solenoid valves 76 and 79 will result in ignition of the burner 19. Since a certain time interval for ignition of the burner 19 and operation thereof at the desired temperature, the time delay relay 49 provides a means for preventing operation of the drive motor 47 to feed plastic foam 14 and a fabric sheet to the apparatus, but upon completion of the time interval determined by the adjustment of the time delay relay 49, the drive motor 47 will be energized to feed plastic foam 14 through the heating zone to prepare the same for bonding to the fabric sheet 27 to provide the laminate 33. In the event the pilot burner 83 becomes extinguished, the thermocouple 85 will cool which will result in actuating the relay 87 to prevent operation of the solenoid valves 76 and 79 with the result that gas and air will not be supplied to the burner 19 unless the pilot burner 83 is burning to ignite the gas and air flowing from the burner 19. As a result of this control system, proper operation of the apparatus is insured.

With particular reference to FIG. 6, the sequence of operation of the apparatus with reference to the plastic foam 14 and fabric sheet 27 is shown and as can be seen from an inspection of this figure, the plastic foam 14 is supplied from the roll 10 along a path of travel 95 which, as shown is generally horizontal, and after passing over the feed roll 15 the plastic foam 14 moves downwardly through a substantially vertical path of travel 96 during which time the plastic foam 14 is pre-heated in the area 97 by means of the radiant heat source 18 and thereafter, the temperature of the plastic foam 14 is raised to the melting point in the area 98 by means of the gas flame 20 emanating from the gas burner 19. Below the area 98, the temperature of the surface of the plastic foam 14 in the area 99 is maintained at the melting point by means of the radiant heat source 21.

The fabric sheet 27 is fed in a generally upward direction from the reel 23 to the point 100 where the fabric sheet 27 progressively and continuously moves into contact with the melted surface of the plastic foam 14 and it is to be noted that the temperature of the melted surface of the plastic foam 14 is maintained at the melting point until contact between the fabric sheet 27 and the plastic foam 14 at the point 100. At this point 100, the plastic foam 14 and fabric sheet 27 pass between the lower and upper pressure rolls 29 and 31 and this serves to unite the plastic foam 14 and fabric sheet 27 to provide the laminate 33 which after leaving the pressure rolls 29 and 31, passes along a generally horizontal path 101 where the same is cooled to set the plastic foam and provide a permanent and intimate bond between such foam and the fabric sheet 27. After trimming of the edges of the laminate 33, the same moves through the depending loop path 42 to relieve internal stresses therein, after which the laminate 33 is wound on the roll 43 for storage or transportation to a desired point of use.

It will be seen that by the above described invention there has been provided a method and apparatus for laminating plastic foam and fabric sheets which may operate continuously at a relatively rapid rate and which will serve to provide a laminate devoid of internal stresses and in which a firm bond is provided between the plastic foam and the fabric sheet. Furthermore, the method and apparatus provided by this invention prevents damage to the foam or to the fabric while at the same time, providing an intimate bond therebetween and the apparatus also contemplates the inclusion of a control system which will eliminate possibility of improper operation and damage to the material which would result in the production of an inferior product.

It will be obvious to those skilled in the art that various changes may be made in the invention without departing from the sprit and scope thereof and therefore the invention is not limited by that which is shown in the drawings and described in the specification, but only as indicated in the appended claims.

What is claimed is:

1. A method of laminating plastic foam and fabric sheets comprising the steps of:
   (a) feeding a sheet of plastic foam with at least substantially an absence of tension thereon, to, through and past a processing station;
   (b) first subjecting one surface of said foam as said foam passes through said processing station, to infrared rays to raise the temperature of said surface from ambient temperature to a value close to and below the melting point of the foam, then secondly applying flame to the initially heated surface of the foam to raise the temperature thereof to the melting point of the foam and melt said surface and thirdly, subject the melted foam surface to further infrared rays to maintain the melted condition thereof;
   (c) thereafter progressively applying fabric to the melted surface of the foam as the same leaves the processing station and while the surface of the foam is maintained at least at the melting point to unite the foam and the fabric as a laminate; and,
   (d) then feeding said laminate through an elongated path as a relaxed loop substantially free of any tension thereon to eliminate internal stresses, and winding said laminate after its leaves said path without subjecting the same to any substantial tension.

2. The method defined in claim 1 and further including the step of directing an air stream onto said laminate to cool and set said melted surface prior to feeding said laminate through said path.

References Cited by the Examiner

UNITED STATES PATENTS

| | | | |
|---|---|---|---|
| 1,853,569 | 4/1932 | Moller | 154—37 |
| 1,902,713 | 3/1933 | Lowe | 154—37 |
| 2,030,878 | 2/1936 | Kamerer et al. | 156—82 |
| 2,295,327 | 9/1942 | Bendz | 242—75.52 |
| 2,529,830 | 11/1950 | Bierer | 18—6 |
| 2,793,677 | 5/1957 | Armstrong | 154—37 |
| 2,957,793 | 10/1960 | Dickey | 154—100 |
| 2,961,332 | 11/1960 | Nairn | 156—78 |
| 2,972,369 | 2/1961 | Jensen | 154—37 XR |

FOREIGN PATENTS 204,254   7/1959   Austria.

ALEXANDER WYMAN, *Primary Examiner.*

CARL F. KRAFFT, EARL M. BERGERT, *Examiners.*